United States Patent
Kim et al.

(10) Patent No.: US 12,107,296 B2
(45) Date of Patent: Oct. 1, 2024

(54) SEPARATOR FOR LITHIUM SECONDARY BATTERY AND LITHIUM SECONDARY BATTERY COMPRISING SAME

(71) Applicant: LG CHEM, LTD., Seoul (KR)

(72) Inventors: Myeongseong Kim, Daejeon (KR); Seongji Ye, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 576 days.

(21) Appl. No.: 17/312,650

(22) PCT Filed: Apr. 28, 2020

(86) PCT No.: PCT/KR2020/005569
§ 371 (c)(1),
(2) Date: Jun. 10, 2021

(87) PCT Pub. No.: WO2020/226321
PCT Pub. Date: Nov. 12, 2020

(65) Prior Publication Data
US 2022/0052417 A1    Feb. 17, 2022

(30) Foreign Application Priority Data

May 3, 2019  (KR) .................. 10-2019-0052462
Apr. 24, 2020  (KR) .................. 10-2020-0050190

(51) Int. Cl.
*H01M 4/00*  (2006.01)
*H01M 10/0525*  (2010.01)
(Continued)

(52) U.S. Cl.
CPC ..... *H01M 50/431* (2021.01); *H01M 10/0525* (2013.01); *H01M 50/463* (2021.01)

(58) Field of Classification Search
CPC .. H01M 4/587; H01M 4/133; H01M 10/0525; C01B 32/21
See application file for complete search history.

(56) References Cited

U.S. PATENT DOCUMENTS 4,587,182 A * 5/1986 Stiles ................. H01M 10/05
29/623.1
5,358,805 A   10/1994 Fujimoto et al.
(Continued)

FOREIGN PATENT DOCUMENTS

CN    104409706 A    3/2015
CN    106186070 A    12/2016
(Continued)

OTHER PUBLICATIONS

Pradeep et al., Method for Creating Nanopores in MOS2 Nanosheets by Chemical Drilling for Disinfection of Water Under Visible Light, Apr. 2019, See the Abstract. (Year: 2019).*
(Continued)

*Primary Examiner* — Cynthia H Kelly
*Assistant Examiner* — Monique M Wills
(74) *Attorney, Agent, or Firm* — Birch, Stewart, Kolasch & Birch, LLP (57) ABSTRACT

Discussed is a separator for a lithium secondary battery and a lithium secondary battery including the same, more specifically, a separator for a lithium secondary battery including a porous substrate and a coating layer on at least one surface of the porous substrate, wherein the coating layer includes a defect-containing molybdenum disulfide. The separator for lithium secondary battery adsorbs lithium polysulfide through the coating layer comprising the defect-containing molybdenum disulfide and suppresses the growth of a lithium dendrite, thereby improving the capacity and lifetime characteristics of the lithium secondary battery.

10 Claims, 4 Drawing Sheets

(51) Int. Cl.
*H01M 50/431* (2021.01)
*H01M 50/463* (2021.01)

(56) References Cited

U.S. PATENT DOCUMENTS

| | | | |
|---|---|---|---|
| 2016/0164103 | A1 | 6/2016 | Son et al. |
| 2017/0117547 | A1 | 4/2017 | Fanous et al. |
| 2017/0170515 | A1* | 6/2017 | Yushin .................. H01M 4/582 |
| 2018/0294461 | A1 | 10/2018 | Feng et al. |
| 2019/0267625 | A1 | 8/2019 | Lee et al. |
| 2020/0028149 | A1 | 1/2020 | Choi et al. |

FOREIGN PATENT DOCUMENTS

| | | | |
|---|---|---|---|
| CN | 107068944 | A | 8/2017 |
| CN | 108232164 | A | 6/2018 |
| CN | 109565073 | A | 4/2019 |
| JP | 7-14572 | A | 1/1995 |
| JP | 2013-179067 | A | 9/2013 |
| JP | 2015-138617 | A | 7/2015 |
| JP | 2018-62707 | A | 4/2018 |
| JP | 2018-536261 | A | 12/2018 |
| JP | 2020-506519 | A | 2/2020 |
| KR | 10-2009-0092070 | A | 8/2009 |
| KR | 10-2016-0046776 | A | 4/2016 |
| KR | 10-2016-0143577 | A | 12/2016 |
| KR | 10-2018-0020096 | A | 2/2018 |
| KR | 10-2016-0037084 | A | 4/2018 |
| KR | 10-1852400 | B1 | 4/2018 |
| WO | WO-2019077635 | A1 * | 4/2019 ........... B01D 61/027 |

OTHER PUBLICATIONS

Cha et al., "2D $MoS_2$ as an efficient protective layer for lithium metal anodes in high-performance Li—S batteries", Nature Nanotechnology, 2018, vol. 13, pp. 337-344.

Chen et al., "2D sandwich-like carbon-coated ultrathin $TiO_2$@defect-rich $MoS_2$ hybrid nanosheets: Synergistic-effect-promoted electrochemical performance for lithium ion batteries", Nano Energy, Aug. 2016, vol. 26, pp. 541-549.

Ghazi et al., "$MoS_2$/Celgard Separator as Efficient Polysulfide Barrier for Long-Life Lithium-Sulfur Batteries", Advanced material, 2017, vol. 29, pp. 1-6, 1606817.

International Search Report (PCT/ISA/210) issued in PCT/KR2020/005569 mailed on Aug. 7, 2020.

Lin et al., "Electrocatalysis of polysulfide conversion by sulfur-deficient $MoS_2$ nanoflakes for lithium-sulfur batteries", Energy & Environmental Science, 2017, vol. 10, pp. 1476-1486.

Tian et al., "Design and facile synthesis of defect-rich C—$MoS_2$/rGO nanosheets for enhanced lithium-sulfur battery performance", Beilstein Journal of Nanotechnology, 2019, vol. 10, pp. 2251-2260.

Tiwari et al., "Prevention of sulfur diffusion using $MoS_2$-intercalated 3D-nanostructured graphite for high-performance lithium-ion batteries", Nanoscale, 2015, vol. 7, pp. 11928-11933.

Wang et al., "Sulfur-deficient $MoS_2$ grown inside hollow mesoporous carbon as a functional polysulfide mediator", J. Mater. Chem. A, 2019, vol. 7, pp. 12068-12074.

Wu et al., "Fabrication of defect-rich $MoS_2$ ultrathin nanosheets for application in lithium-ion batteries and supercapacitors", J. Mater. Chem. A, 2015, vol. 3, pp. 19445-19454.

Xie et al., "Defect-Rich $MoS_2$ Ultrathin Nanosheets with Additional Active Edge Sites for Enhanced Electrocatalytic Hydrogen Evolution", Adv. Mater., 2013, vol. 25, No. 40, pp. 5807-5813.

Yang et al., "A 3D $MoS_2$/Graphene Microsphere Coated Separator for Excellent Performance Li—S Batteries", Materials 2018, vol. 11, 2064, pp. 1-13.

Zhang et al., "Rational Design of MXene/1T—2H $MoS_2$—C Nanohybrids for High-Performance Lithium-Sulfur Batteries", Adv. Funct. Mater., 2018, vol. 28, pp. 1-9.

Zhang et al., "Unconventional Pore and Defect Generation in Molybdenum Disulfide: Application in High-Rate Lithium-Ion Batteries and the Hydrogen Evolution Reaction", ChemSusChem 2014, vol. 7, pp. 2489-2495.

\* cited by examiner

SEPARATOR FOR LITHIUM SECONDARY BATTERY AND LITHIUM SECONDARY BATTERY COMPRISING SAME

TECHNICAL FIELD

This application claims the benefits of Korean Patent Application No. 10-2019-0052462 filed on May 3, 2019 and Korean Patent Application No. 10-2020-0050190 filed on Apr. 24, 2020 with the Korean Intellectual Property Office, the disclosure of which are herein incorporated by reference in their entirety.

The present invention relates to a separator for a lithium secondary battery and a lithium secondary battery comprising the same.

BACKGROUND ART

As the utilization range of lithium secondary batteries is expanded not only to portable electronic devices and communication devices, but also to electric vehicles (EV) and electric storage systems (ESS), the demand for high capacity of lithium secondary batteries used as their power sources is increasing.

The lithium-sulfur battery among various lithium secondary batteries is a secondary battery using a sulfur-based material having an S—S bond (sulfur-sulfur bond) as a positive electrode active material and using lithium metal, a carbon-based material in which intercalation/deintercalation of lithium ions occurs, or silicon or tin that forms an alloy with lithium as a negative electrode active material.

There is an advantage that sulfur, which is the main material of the positive electrode active material in the lithium-sulfur battery, has a low atomic weight, is very rich in resources and thus easy to supply and receive, and is cheap, non-toxic and environmentally friendly.

In addition, the lithium-sulfur battery has a theoretical discharging capacity of 1,675 mAh/g derived from a conversion reaction of lithium ion and sulfur ($S_8 + 16Li^+ + 16e^- \rightarrow 8Li_2S$) in the positive electrode, and if lithium metal (theoretical capacity: 3,860 mAh/g) is used as the negative electrode, the theoretical energy density is 2,600 Wh/kg. Since the theoretical energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg) and commercial lithium secondary batteries (LiCoO$_2$/graphite), the lithium-sulfur battery is attracting attention as a high-capacity, eco-friendly, and low-cost lithium secondary battery among secondary batteries that have been developed to date, and is a next-generation battery system to which several studies are being conducted.

During the discharging of the lithium-sulfur battery, a reduction reaction in which sulfur accepts electrons occurs at the positive electrode and an oxidation reaction in which lithium is ionized occurs at the negative electrode, respectively. The lithium-sulfur battery generates lithium polysulfide ($Li_2S_x$, x=2 to 8) in the positive electrode during the discharging, and the lithium polysulfide is dissolved in the electrolyte and leached from the positive electrode, and thus the reversible capacity of the positive electrode is greatly reduced, and also the dissolved lithium polysulfide diffuses to the negative electrode, causing various side reactions. Also, during the charging process, the lithium polysulfide causes a shuttle reaction, thereby significantly reducing the charging/discharging efficiency.

Since the leaching of the lithium polysulfide adversely affects the capacity and lifetime characteristics of the battery, various techniques have been proposed to solve the problem of lithium polysulfide.

As an example, Korean Patent Publication No. 2018-0020096 discloses that by including a separator having a catalyst layer containing a transition metal compound, the shuttle reaction due to the leaching of the lithium polysulfide can be suppressed and thus the capacity and cycle characteristics of the battery can be improved.

In addition, Korean Patent Publication No. 2016-0046775 discloses that it is possible to improve the cycle characteristics of a battery by providing a positive electrode coating layer made of an amphiphilic polymer on a part of the active part of the positive electrode containing a sulfur-carbon composite, thereby inhibiting the leaching of the lithium polysulfide and facilitating the movement of lithium ions.

In addition, Korean Patent Publication No. 2016-0037084 discloses that by coating graphene on the carbon nanotube aggregate containing sulfur, the lithium polysulfide is prevented from being dissolved, and the electrical conductivity of the sulfur-carbon nanotube composite and the loading amount of sulfur can be increased.

These patents prevent the loss of sulfur to improve the problem of performance or lifetime degradation of the lithium-sulfur battery to some extent, by introducing a substance capable of adsorbing the lithium polysulfide into the positive electrode or separator, but the effect is insufficient. In addition, a deterioration problem may occur due to the newly introduced material, and the methods presented in these patents are somewhat complicated, and also there is a problem that the amount of sulfur, a positive electrode active material (i.e., loading amount) that can be introduced is limited. Therefore, it is necessary to develop a lithium-sulfur battery having excellent performance by solving the leaching problem of lithium polysulfide.

PRIOR ART DOCUMENT

[Patent Document]

Korean Patent Publication No. 2018-0020096 (Feb. 27, 2018), Separator for lithium sulfur batteries with catalyst coating.

Korean Patent Publication No. 2016-0046775 (Apr. 29, 2016), CATHODE FOR LITHIUM-SULFUR BATTERY AND METHOD OF PREPARING THE SAME.

Korean Patent Publication No. 2016-0037084 (Apr. 5, 2016), SURFUR-CARBONNANOTUBE COMPLEX, METHOD OF PREPARING THE SAME, CATHODE ACTIVE MATERIAL FOR LITHIUM-SULFUR BATTERY INCLUDING THE SAME AND LITHIUM-SULFUR BATTERY INCLUDING THE SAME.

DISCLOSURE

Technical Problem

As a result of various studies to solve the above problems, the inventors of the present invention have confirmed that the performance and lifetime of the lithium secondary battery can be improved by introducing an coating layer comprising defect-containing molybdenum disulfide on the substrate of the separator, and thus solving the problems of the leaching of the lithium polysulfide in the lithium-sulfur battery and suppressing the growth of the lithium dendrite on the negative electrode, thereby having completed the present invention.

Accordingly, it is an object of the present invention to provide a separator for a lithium secondary battery that improves the capacity and lifetime characteristics of a lithium secondary battery by solving the problems caused by the leaching of the lithium polysulfide.

In addition, it is another object of the present invention to provide a lithium secondary battery comprising the above-mentioned separator.

Technical Solution

In order to achieve the above objects, the present invention provides a separator for a lithium secondary battery comprising a porous substrate and a coating layer on at least one surface of the porous substrate, wherein the coating layer comprises defect-containing molybdenum disulfide.

The defect-containing molybdenum disulfide may be in the shape of a nanosheet.

The nanosheet may have a thickness of from 1 nm to 20 nm.

The defect-containing molybdenum disulfide may be crystalline.

The defect-containing molybdenum disulfide may have diffraction peaks that appear at diffraction angles (2θ) in the range of 14.0±0.2°, 33.1±0.2°, 39.4±0.2° and 58.7±0.2°, respectively, as measured by X-ray diffraction (XRD).

The defect of the defect-containing molybdenum disulfide may be at least one selected from the group consisting of a point defect, a line defect and a plane defect.

The coating layer may have a thickness of from 0.1 μm to 10 μm.

The coating layer may be disposed to face the negative electrode of the lithium secondary battery.

In addition, the present invention provides a lithium secondary battery comprising the above-mentioned separator for the lithium secondary battery.

Advantageous Effects

The defect-containing molybdenum disulfide comprised in the coating layer of the separator according to the present invention improves the capacity and lifetime characteristics of a lithium secondary battery, especially a lithium-sulfur battery, comprising it, by providing additional electrochemical catalytic activity by the edges of the defect, and thus promoting the adsorption effect of the lithium polysulfide and the suppression effect on the production of the lithium dendrite.

Therefore, in the case of the lithium secondary battery equipped with a separator having a coating layer comprising the defect-containing molybdenum disulfide, because there is no deterioration in the capacity of sulfur, it is possible not only to realize a high-capacity battery and stably apply sulfur with high loading, but also to prevent the growth of lithium dendrite, so there is no problem of short circuit or heat generation of the battery or the like, thereby improving the stability of the battery. In addition, in the case of such lithium secondary battery, there is an advantage that the charging/discharging efficiency of the battery is high and lifetime characteristics are improved.

BEST MODE

Hereinafter, the present invention will be described in more detail.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The terminology used in the present invention is for the purpose of describing particular embodiments only and is not intended to be limiting of the invention. The singular forms "a," "an," and "the" include plural referents unless the context clearly dictates otherwise. It is to be understood that the terms "comprise" or "have" as used in the present invention, are intended to designate the presence of stated features, numbers, steps, operations, components, parts or combinations thereof, but not to preclude the possibility of the presence or addition of one or more other features, numbers, steps, operations, components, parts, or combinations thereof.

In the present invention, the term "porosity" means the ratio of the volume occupied by the pores to the total volume in a structure, and its unit is %. In the present invention, the measurement of porosity is not particularly limited. For example, according to one embodiment of the present invention, the micro and meso pore volume can be measured by, for example, a Brunauer-Emmett-Teller (BET) measurement method or a Hg porosimeter.

The term "polysulfide" used in the present invention has a concept including both "polysulfide ion ($S_x^{2-}$, x=8, 6, 4, 2)" and "lithium polysulfide ($Li_2S_x$ or $LiS_x^-$, x=8, 6, 4, 2)".

The lithium-sulfur battery has higher discharging capacity and theoretical energy density than other various secondary batteries, and is attracting attention as a next-generation secondary battery due to the advantage that sulfur, which is used as a positive electrode active material, is rich in resources and is cheap and environmentally friendly.

Sulfur, which is used as a positive electrode active material in the lithium-sulfur battery, is converted from the cyclic $S_8$ structure to the linear structures of lithium polysulfides ($Li_2S_x$, x=8, 6, 4, 2) by the reduction reaction and, when the lithium polysulfides are completely reduced, lithium sulfide ($Li_2S$) is finally produced. Among the lithium polysulfides which are the intermediate products of this sulfur reduction reaction, lithium polysulfides ($Li_2S_x$, usually x>4), which has the high oxidation number of sulfur, are substances with a strong polarity, and are easily dissolved in the electrolyte comprising a hydrophilic organic solvent and thus released outside the reaction zone of the positive electrode, thereby no longer participating in the electrochemical reaction and thus resulting in the loss of sulfur.

Despite advantages as described above, since the amount of sulfur involved in the electrochemical reaction is sharply reduced due to this sulfur leaching, the lithium-sulfur battery does not realize all of theoretical capacity and energy density in actual operation. In addition, due to the side reaction of lithium metal used as the negative electrode and lithium polysulfide, there is a problem that the degradation of initial capacity and the cycle characteristics are accelerated after certain cycles.

For this purpose, in the prior art, there has been proposed a method of introducing an substance capable of inhibiting the leaching of the lithium polysulfide into the positive electrode or the separator in the form of an additive or a coating layer, a method of changing the composition of the electrolyte, a method of forming a protective layer or a solid-electrolyte interphase (SEI) layer on the surface of the negative electrode or the like. However, there are disadvantages that such a method is not only insufficient in improving the effect of the leaching of the lithium polysulfide, but also has limitations in the amount of loading of sulfur, causes serious problems in the stability of the battery, or is inefficient in view of the process.

Accordingly, in order to suppress the leaching of the lithium polysulfide and thus secure the effect of improving the capacity and lifetime characteristics of the lithium secondary battery, the present invention provides a separator for a lithium secondary battery having a coating layer comprising defect-containing molybdenum disulfide (defect-rich $MoS_2$) capable of adsorbing the lithium polysulfide.

Specifically, the separator for lithium secondary battery according to the present invention comprises a porous substrate and a coating layer formed on at least one surface of the porous substrate, wherein the coating layer comprises defect-containing molybdenum disulfide (defect-rich $MoS_2$).

The porous substrate constituting the separator for the lithium secondary battery of the present invention enables the transport of lithium ions between the negative electrode and the positive electrode while separating or insulating the negative electrode and the positive electrode from each other. Therefore, the separator of the present invention may be made of a porous, nonconductive or insulating material. Also, the separator may be an independent member such as a film.

Specifically, the porous substrate may be a porous polymer film alone or a laminate of porous polymeric films, and for example, may be a non-woven fabric made of glass fiber or polyethyleneterephthalate fiber with high melting point, etc., or a polyolefin-based porous film, but is not limited thereto.

The material of the porous substrate is not particularly limited in the present invention, and any material can be used as long as it is a porous substrate commonly used in an electrochemical device. For example, the porous substrate may comprise at least one material selected from the group consisting of polyolefin such as polyethylene and polypropylene, polyester such as polyethyleneterephthalate and polybutyleneterephthalate, polyamide, polyacetal, polycarbonate, polyimide, polyetheretherketone, polyethersulfone, polyphenyleneoxide, polyphenylenesulfide, polyethylenenaphthalate, polytetrafluoroethylene, polyvinylidene fluoride, polyvinyl chloride, polyacrylonitrile, cellulose, poly(p-phenylene benzobisoxazole) and polyarylate.

The thickness of the porous substrate is not particularly limited, but may be from 1 to 100 μm, preferably from 5 to 50 μm. Although the thickness range of the porous substrate is not particularly limited to the above-mentioned range, when the thickness is excessively thinner than the lower limit described above, mechanical properties are deteriorated and thus the separator may be easily damaged during use of the battery.

The size and porosity of the pores present in the porous substrate are also not particularly limited, but may be from 0.001 to 50 μm and from 10 to 95%, respectively.

In the present invention, the coating layer is formed on at least one surface of the aforementioned porous substrate, and comprises defect-containing molybdenum disulfide (defect-rich $MoS_2$).

The defect-containing molybdenum disulfide (defect-rich $MoS_2$) improves the capacity and lifetime of a lithium secondary battery, specifically a lithium-sulfur battery, by adsorbing the lithium polysulfide and thus solving the problem of loss of sulfur and capacity loss caused by the leaching of the lithium polysulfide in the conventional lithium-sulfur battery, and the battery can be stably operated even when sulfur is highly loaded.

In addition, the defect-containing molybdenum disulfide (defect-rich $MoS_2$) solves the problem of side reactions on the surface of the negative electrode caused by the shuttle effect of the lithium polysulfide, for example, the problem of formation of a high resistance layer of $Li_2S$ at the interface by reaction with lithium metal used as a negative electrode or the problem of the growth of lithium dendrites by the precipitation of lithium at the interface of the negative electrode, by confining the lithium polysulfide to the coating layer of the separator, thereby improving the coulomb efficiency and lifetime of the battery.

In relation to the above-described growth problem of the lithium dendrite, since the defect-containing molybdenum disulfide (defect-rich $MoS_2$) has a layered structure and exhibits an in-plane carrier mobility of 200 to 500 $cm^2/Vs$, it is not only easy to intercalate/deintercalate lithium ions, but also to facilitate ion movement. This effectively suppresses the growth of the lithium dendrite, by reducing the interface resistance of lithium metal and promoting the constant flow of lithium on the surface of lithium metal, and thus controlling the speed of movement of electrons on the surface of lithium metal and promoting the uniform distribution of lithium ions.

Even in the prior art, molybdenum disulfide was used as a material having an adsorption capacity for the lithium polysulfide in the lithium-sulfur battery, but the used molybdenum disulfide is molybdenum disulfide (defect-free $MoS_2$) that has no defect in the crystal structure. In comparison, the molybdenum disulfide included in the coating layer of the present invention has artificially formed defect. The defect additionally provides an 'active edge site' to molybdenum disulfide, thereby providing electrochemical catalytic activity to promote the effect of inhibiting the leaching of the lithium polysulfide and the growth of the lithium dendrite as described above. Therefore, since the molybdenum disulfide according to the present invention exhibits an improved adsorption effect on the lithium polysulfide, and an improved preventive effect on the production of the lithium dendrite, compared to the defect-free molybdenum disulfide (defect-free $MoS_2$), which is conventionally used, so that the capacity and lifetime characteristics of the lithium secondary battery comprising the same can be significantly improved.

Specifically, the defect-containing molybdenum disulfide has a disordered atomic arrangement on its surface as defect and may be represented by $MoS_{2-x}$ ($0<x<0.5$) as a chemical formula. In the defect-containing molybdenum disulfide of the present invention, the defect allow to secure an additional open space on the chemical structure of the molybdenum disulfide, and the open space facilitates the movement of ions, so that the defect-containing molybdenum disulfide exhibits improved electrochemical reactivity compared to the defect-free molybdenum disulfide.

The defect-containing molybdenum disulfide is prepared by the preparation method presented in the present invention, and such preparation method is described later. The defect-containing molybdenum disulfide prepared according to the preparation method of the present invention is in the shape of a nanosheet having a thickness of from 1 to 20 nm, preferably from 1 to 10 nm, and the molybdenum disulfide in the shape of a nanosheet includes regularly or irregularly formed defect of various sizes.

The defect is an inherent defect formed during the preparation of the molybdenum disulfide and may be a structural defect, and for example, may be at least one selected from the group consisting of a point defect, a line defect and a plane defect. Specifically, the defect may be at least one selected from the group consisting of point defects such as vacancy and interstitial atoms, line defects such as dislocation, and plane defects such as grain boundary.

The defect-containing molybdenum disulfide may comprise a plurality of defects. The separation distances between the plurality of defects may correspond to each other or may be different from each other. The sizes of the plurality of defects may correspond to each other or may differ from each other.

The defect-containing molybdenum disulfide of the present invention may be crystalline. This may be confirmed by X-ray diffraction (XRD) measurement. Significant or effective peaks in X-ray diffraction (XRD) analysis mean peaks that are repeatedly detected in a substantially identical pattern in XRD data without being significantly affected by analytical conditions or analytical performers and in other words, mean peaks having a height, intensity, strength, etc. of 1.5 times or more, preferably 2 times or more, more preferably 2.5 times or more, compared to a background level.

As a result of the analysis by X-ray diffraction (XRD) using Cu-Kα X-ray wavelength for the defect-containing molybdenum disulfide, the defect-containing molybdenum disulfide comprises effective peaks that appear in the range of diffraction angles (2θ) of 14.0±0.2°, 33.1±0.2°, 39.4±0.2° and 58.7±0.2°, respectively, and these peaks mean diffraction peaks corresponding to the crystal planes of (002), (100, 101), (103) and (110), respectively. From this, it can be confirmed that the defect-containing molybdenum disulfide of the present invention is crystalline.

As a result of analysis by Energy Dispersive X-ray Spectrometer (EDS) for the defect-containing molybdenum disulfide, it can be seen that the defect-containing molybdenum disulfide is formed to have an atomic ratio of Mo:S of 1:1.7. Through this, it can be seen that the defect-containing molybdenum disulfide of the present invention is a compound represented by $MoS_{2-x}$ ($0<x<0.5$).

When the coating layer comprising the defect-containing molybdenum disulfide is formed on one surface of the porous substrate, the coating layer may be disposed to face the negative electrode or the positive electrode, and is not particularly limited in the present invention. However, when the lithium secondary battery of the present invention comprises lithium metal as a negative electrode active material, it is preferable that the coating layer is disposed to face the negative electrode. At this time, the coating layer is formed to face the negative electrode, thereby suppressing side reactions between lithium polysulfide, which is diffused from the positive electrode containing sulfur, and lithium metal, as well as preventing the growth of the lithium dendrite, thereby increasing the lifetime and stability of the battery.

The thickness of the coating layer in the separator for the lithium secondary battery according to the present invention is not particularly limited, and has a range that does not increase the internal resistance of the battery while ensuring the above effect. For example, the thickness of the coating layer may be from 0.1 to 10 μm, preferably from 0.1 to 5 μm, and more preferably from 0.1 to 1 μm. When the thickness of the coating layer is less than the above range, it cannot function as a coating layer. On the contrary, when the thickness of the coating layer exceeds the above range, the interfacial resistance may be increased, thereby leading to an increase in internal resistance during the operation of the battery.

A method for manufacturing a separator for a lithium secondary battery proposed in the present invention is not particularly limited in the present invention, and a variety of methods known to those skilled in the art, or variations thereof, are available.

As an example, the method of manufacturing the separator for the lithium secondary battery comprises the steps of,
(a) preparing a defect-containing molybdenum disulfide,
(b) preparing a coating composition comprising the defect-containing molybdenum disulfide and
(c) applying the coating composition to at least one surface of a porous substrate.

First, the preparation of the defect-containing molybdenum disulfide in step (a) may be carried out by reaction of a molybdenum precursor and a sulfur precursor.

Specifically, step of preparing the defect-containing molybdenum disulfide in step (a) may comprise the steps of,
(a-1) preparing a mixed solution by dissolving the molybdenum precursor and the sulfur precursor in an aqueous solvent;
(a-2) forming a molybdenum disulfide by hydrothermal synthesis of the mixed solution and
(a-3) drying the molybdenum disulfide formed in step (a-2).

The molybdenum precursor in step (a-1) means a material capable of forming molybdenum disulfide ($MoS_2$) by reacting with the sulfur precursor. The molybdenum precursor is sodium molybdate ($Na_2MoO_4$), ammonium tetrathiomolybdate (($NH_4)_2MoS_4$), ammonium heptamolybdate tetrahydrate (($NH_4)_6Mo_7O_{24} \cdot 4H_2O$), molybdenum trioxide ($MoO_3$) and molybdenum chloride ($MoCl_5$) and the like and is various in its kind. However, when considering reaction conditions and the like, ammonium heptamolybdate tetrahydrate may be preferably used.

Examples of types of the sulfur precursor may comprise thiourea ($CH_4N_2S$) sodium thiosulfate ($Na_2S_2O_3$), sodium sulfide ($Na_2S$) and hydrogen sulfide ($H_2S$). However, when considering the reactivity with the aqueous solvent, the temperature of hydrothermal synthesis, and the like, thiourea can be preferably used.

The molybdenum precursor and sulfur precursor are added to the aqueous solvent such as deionzied water, and stirred vigorously for from 10 minutes to 1 hour to prepare a mixed solution.

At this time, molybdenum and sulfur may have a molar ratio of 1:2 or more, preferably from 1:3 to 1:5 based on the mixed solution. When the proportion of sulfur is less than the above range, a sufficient amount of molybdenum disulfide may not be prepared based on the reactants added. When the molar ratio of the molybdenum and sulfur falls within the above-described range, a sufficient amount of sulfur not only reduces Mo (VI) to Mo (IV), but also stabilizes the morphology of molybdenum disulfide in the shape of a nanosheet to be described later. Therefore, the excess sulfur precursor is adsorbed on the surface of the primary nanocrystals of the molybdenum disulfide, partially inhibiting directional crystal growth, and thus is capable of forming a molybdenum disulfide having a structure with many defects having a quasiperiodic constitution.

Next, the prepared mixed solution is subjected to step of forming molybdenum disulfide by introducing into a reactor for hydrothermal synthesis, such as autoclave.

The hydrothermal synthesis reaction may be performed at a temperature of from 180 to 240° C. for from 10 to 24 hours, and preferably at a temperature of from 200 to 220° C. for from 16 to 20 hours.

After the hydrothermal synthesis reaction, the reaction product may be slowly cooled to room temperature and the final product may be washed several times with water and ethanol. Through these processes, residual ionic components or impurities remaining in the final product may be removed.

Next, the final product of hydrothermal synthesis is dried at from 60 to 80° C. to obtain molybdenum disulfide. The drying is preferably performed under vacuum condition for from 6 to 12 hours.

The molybdenum disulfide prepared according to the preparation method comprising steps (a-1) to (a-3) is prepared by introducing a sulfur precursor in an amount equal to or greater than a certain molar ratio as described above, and thus is a defect-containing molybdenum disulfide.

Subsequently, step (b) of preparing a coating composition comprising the defect-containing molybdenum disulfide prepared by the above-described preparing method is performed.

The coating composition may further include a solvent in addition to the defect-containing molybdenum disulfide as described above, and the solvent is not particularly limited as long as it can dissolve the defect-containing molybdenum disulfide. As an example, the solvent may be a mixed solvent of water and alcohol or a mixture of one or more organic solvents. At this time, the alcohol may be a lower alcohol having 1 to 6 carbon atoms, preferably methanol, ethanol, propanol, isopropanol or the like. Examples of the organic solvent may comprise polar solvents such as acetic acid, dimethyl formamide (DMF), N-methyl-2-pyrrolidone (NMP) and dimethyl sulfoxide (DMSO) and nonpolar solvents such as acetonitrile, ethyl acetate, methyl acetate, fluoroalkane, pentane, 2,2,4-trimethylpentane, decane, cyclohexane, cyclopentane, diisobutylene, 1-pentene, 1-chlorobutane, 1-chloropentane, o-xylene, diisopropyl ether, 2-chloropropane, toluene, 1-chloropropane, chlorobenzene, benzene, diethyl ether, diethyl sulfide, chloroform, dichloromethane, 1,2-dichloroethane, aniline, diethylamine, ether, carbon tetrachloride, methylene chloride, tetrahydrofuran (THF), etc. Preferably, at least one selected from the group consisting of dimethylformamide, methylene chloride and N-methyl-2-pyrrolidone may be used.

The content of the solvent may be at a level of having such a concentration as to facilitate the coating, and the specific content varies depending on the coating method and apparatus. As an example, after dispersing defect-containing molybdenum disulfide in a solvent, it may be mixed to prepare a coating composition. At this time, the concentration of the final coating composition may be adjusted to be in the range of from 0.1 to 10% by weight (solids content), and then the coating may be carried out.

Subsequently, step (c) of applying the coating composition as described above to at least one surface of the porous substrate is performed.

The application in step (c) is not particularly limited in the present invention, and any known wet coating method may be used. As an example, the coating method may comprise a method of uniformly dispersing using a doctor blade and the like and methods such as die casting, comma coating, screen printing and vacuum filtration coating.

Additionally, after step (c), a drying process for removing the solvent may be further performed. The drying process may be performed at a temperature and a time sufficient to sufficiently remove the solvent. The conditions may vary depending on the type of the solvent, and therefore, it is not specifically mentioned in the present invention. For example, the drying process may be carried out in a vacuum oven at from 30 to 200° C. Examples of the drying method may comprise a drying method by warm air, hot air, or low-humidity air and a vacuum drying method. The drying time is not particularly limited, but may be usually performed in the range of from 30 seconds to 24 hours.

The thickness of the coating layer to be finally formed may be controlled by adjusting the concentration of the coating composition according to the present invention, the number of times of coating, or the like.

Also, the present invention provides a lithium secondary battery comprising the separator described above.

The lithium secondary battery comprises a positive electrode, a negative electrode, a separator interposed therebetween and an electrolyte, wherein the separator comprises the separator according to the present invention.

Preferably, the lithium secondary battery may be a lithium-sulfur battery containing sulfur as a positive electrode active material.

The positive electrode may comprise a positive electrode current collector and a positive electrode active material coated on one or both sides of the positive electrode current collector.

The positive electrode current collector supports the positive electrode active material and is not particularly limited as long as it has high conductivity without causing chemical changes in the battery. For example, copper, stainless steel, aluminum, nickel, titanium, palladium, sintered carbon; copper or stainless steel surface-treated with carbon, nickel, silver or the like; aluminum-cadmium alloy or the like may be used as the positive electrode current collector.

The positive electrode current collector can enhance the bonding strength with the positive electrode active material by having fine irregularities on its surface, and may be formed in various forms such as film, sheet, foil, mesh, net, porous body, foam or nonwoven fabric.

The positive electrode active material may comprise a positive electrode active material and optionally an electrically conductive material and a binder.

The positive electrode active material comprises a sulfur-based compound, specifically, a sulfur element or a sulfur-based compound. The sulfur element may comprise inorganic sulfur ($S_8$). In addition, the sulfur-based compound may be at least one selected from the group consisting of $Li_2S_n(n≥1)$, a disulfide compound, an organic sulfur compound and a carbon-sulfur polymer $((C_2S_x)_n$: x=2.5 to 50, n≥2). Preferably, inorganic sulfur ($S_8$) may be used.

The sulfur-based compound is used in combination with an electrically conductive material because it does not have electrical conductivity alone. Preferably, the positive electrode active material may be a sulfur-carbon composite.

The carbon in the sulfur-carbon composite is a porous carbon material and provides a framework capable of uniformly and stably immobilizing sulfur, which is a positive electrode active material, and supplements the electrical conductivity of sulfur to enable the electrochemical reaction to proceed smoothly.

The porous carbon material can be generally produced by carbonizing precursors of various carbon materials. The porous carbon material may comprise uneven pores therein, the average diameter of the pores is in the range of from 1 to 200 nm, and the porosity may be in the range of from 10 to 90% of the total volume of the porous carbon material. When the average diameter of the pores is less than the above range, the pore size is only at the molecular level and impregnation with sulfur is impossible. On the contrary, when the average diameter of the pores exceeds the above range, the mechanical strength of the porous carbon is weakened, which is not preferable for application to the manufacturing process of the electrode.

The shape of the porous carbon material may be in the form of sphere, rod, needle, plate, tube or bulk, and may be used without limitation as long as it is commonly used in a lithium-sulfur battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and natural graphite, artificial graphite, expanded graphite and activated carbon. Preferably, the porous carbon material may be carbon nanotubes.

In the present invention, the sulfur-carbon composite may include from 60 to 90 parts by weight, preferably from 65 to 85 parts by weight, and more preferably from 70 to 80 parts by weight of sulfur based on 100 parts by weight of the sulfur-carbon composite. When the content of the sulfur is less than the above-mentioned range, as the content of the porous carbon material in the sulfur-carbon composite is relatively increased, the specific surface area is increased, so that the content of the binder should be increased when preparing the slurry. Increasing the amount of use of the binder may eventually increase the sheet resistance of the positive electrode and acts as an insulator preventing electron pass, thereby deteriorating the performance of the battery. On the contrary, when the content of the sulfur exceeds the above-mentioned range, as the sulfur or sulfur compounds that are not combined with the porous carbon material are aggregated with each other or re-leached to the surface of the porous carbon material, it is difficult to receive electrons and thus cannot participate in the electrochemical reaction, resulting in capacity loss of the battery.

The positive electrode active material may further comprise at least one additive selected from a transition metal element, a group IIIA element, a group IVA element, a sulfur compound of these elements and an alloy of these elements and sulfur, in addition to the above-described components.

The transition metal element may comprise Sc, Ti, V, Cr, Mn, Fe, Co, Ni, Cu, Zn, Y, Zr, Nb, Mo, Tc, Ru, Rh, Pd, Os, Ir, Pt, Au, Hg or the like, and the group IIIA element may comprise Al, Ga, In, Tl and the like, and the group IVA element may comprise Ge, Sn, Pb and the like.

The positive electrode active material may be included in an amount of from 50 to 95 parts by weight, preferably from 70 to 90 parts by weight based on 100 parts by weight of the slurry composition for the positive electrode. When the content of the positive electrode active material is less than the above range, it is difficult for the positive electrode to sufficiently exert an electrochemical reaction. On the contrary, when the content exceeds the above range, there is a problem that the resistance of the positive electrode is increased and the physical properties of the positive electrode are lowered due to a relatively insufficient content of the electrically conductive material and the binder to be described later.

In addition, the positive electrode may further comprise an electrically conductive material, and the electrically conductive material is a material that acts as a path, through which electrons are transferred from the current collector to the positive electrode active material, by electrically connecting the electrolyte and the positive electrode active material. The electrically conductive material may be used without limitation as long as it has porosity and electrical conductivity.

For example, carbon-based materials having porosity may be used as an electrically conductive material. Such carbon-based materials may comprise carbon black, graphite, graphene, activated carbon, carbon fiber, and the like. In addition, metallic fibers such as metal mesh; metallic powder such as copper, silver, nickel, and aluminum or organic electrically-conductive materials such as polyphenylene derivatives may be also used. The electrically conductive materials may be used alone or in combination.

The electrically conductive material may be included in an amount of from 1 to 10 parts by weight, preferably about from 5 parts by weight, based on 100 parts by weight of the slurry composition for the positive electrode. When the content of the electrically conductive material is less than the above range, the unreacted portion of the sulfur increases, and eventually capacity loss occurs. On the contrary, when the content exceeds the above range, it has a negative effect on high-efficiency discharging characteristics and charging/discharging cycle lifetime. Therefore, it is preferable that the content is appropriately determined within the above-described range.

In addition, the positive electrode may further comprise a binder. The binder enhances adhesion force between the components constituting the positive electrode and between them and the current collector, and any binder known in the art may be used as the binder.

For example, the binder may be fluororesin-based binders comprising polyvinylidene fluoride (PVdF) or polytetrafluoroethylene (PTFE); rubber-based binders comprising styrene butadiene rubber (SBR), acrylonitrile-butadiene rubber, and styrene-isoprene rubber; cellulose-based binders comprising carboxymethylcellulose (CMC), starch, hydroxypropylcellulose, and regenerated cellulose; polyalcohol-based binders; polyolefin-based binders comprising polyethylene and polypropylene; polyimide-based binders; polyester-based binders; and silane-based binders, or mixtures or copolymers of two or more thereof.

The binder may be included in an amount of from 1 to 10 parts by weight, preferably about from 5 parts by weight based on 100 parts by weight of the slurry composition for the positive electrode. When the content of the binder is less than the above range, the physical properties of the positive electrode may be deteriorated, and thus the positive electrode active material and the electrically conductive material may be detached. When the content exceeds the above range, since the ratio of the active material to the electrically conductive material in the positive electrode is relatively reduced, the battery capacity may be reduced. Therefore, it is preferable that the content is appropriately determined within the above-described range.

The positive electrode may be prepared by a conventional method known in the art. For example, the positive electrode may be prepared by mixing and stirring a solvent, if necessary, a binder, an electrically conductive material, and a dispersant in a positive electrode active material to prepare slurry, then applying (coating) the slurry to a current collector of a metal material, compressing and drying it.

As a solvent, a solvent capable of uniformly dispersing the positive electrode active material, the binder, and the electrically conductive material may be used. As such a solvent, water is most preferred as an aqueous solvent. At this time, water may be distilled water or deionized water, but is not necessarily limited thereto, and if necessary, a lower alcohol which can be easily mixed with water may be used. Examples of the lower alcohol may comprise methanol, ethanol, propanol, isopropanol, and butanol. Preferably, they may be used in admixture with water.

The porosity of the positive electrode, specifically the positive electrode active material layer, prepared by the above-described composition and manufacturing method may be from 60 to 75%, preferably from 60 to 70%. When the porosity of the positive electrode does not reach 60%, since the filling degree of the slurry composition for the positive electrode including the positive electrode active material, the electrically conductive material, and the binder is too high, so that sufficient electrolyte solution capable of exhibiting ionic conductivity and/or electrical conduction between the positive electrode active materials cannot be maintained, there may be a problem that the output characteristics or cycle characteristics of the battery may be deteriorated, and the overvoltage and the loss of the discharging capacity of the battery become severe. On the contrary, when the porosity of the positive electrode exceeds 75% and has an excessively high porosity, there is a problem that the physical and electrical connection with the current collector is lowered, so the adhesive strength is lowered and the reaction becomes difficult, and also there is a problem that the energy density of the battery may be lowered by filling the increased porosity with the electrolyte solution. Therefore, the porosity is appropriately adjusted within the above range.

The negative electrode may comprise a material capable of reversibly intercalating or deintercalating lithium ion ($Li^+$), a material capable of reversibly forming lithium containing compounds by reacting with lithium ion, or lithium metal or lithium alloy.

The material capable of reversibly intercalating or deintercalating lithium ion ($Li^+$) may be, for example, crystalline carbon, amorphous carbon, or a mixture thereof. The material capable of reacting with lithium ion ($Li^+$) to reversibly form lithium containing compounds may be, for example, tin oxide, titanium nitrate, or silicon. The lithium alloy may be, for example, an alloy of lithium (Li) and a metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

Preferably, the negative electrode active material may be lithium metal, and specifically may be in the form of a lithium metal thin film or lithium metal powder.

The negative electrode current collector is as described for the positive electrode current collector.

In addition, the negative electrode may further comprise additives such as a binder, an electrically conductive material, and a thickener, and is not particularly limited as long as they are typical materials used in manufacturing a negative electrode. The binder and the electrically conductive material are as described in the positive electrode.

The separator is as described above.

The electrolyte comprises lithium ions and is used for causing an electrochemical oxidation or reduction reaction between a positive electrode and a negative electrode through these.

The electrolyte may be a non-aqueous electrolyte solution or a solid electrolyte which does not react with lithium metal, but is preferably a non-aqueous electrolyte solution, and comprises an electrolyte salt and an organic solvent.

The electrolytic salt which is comprised in the non-aqueous electrolyte solution is lithium salt. The lithium salt may be used without limitation as long as it is commonly used in an electrolyte solution for a lithium secondary battery. For example, the lithium salt may be LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, $LiN(SO_2F)_2$, lithium chloroborane, lithium lower aliphatic carboxylate, tetra-phenyl lithium borate, lithium imide, etc.

The concentration of the lithium salt may be from 0.2 to 2 M, preferably from 0.4 to 2 M, more preferably from 0.4 to 1.7 M depending on various factors such as the exact composition of the electrolyte solvent mixture, the solubility of the salt, the conductivity of the dissolved salt, the charging and discharging conditions of the battery, the operating temperature, and other factors known in the lithium battery field. When the concentration of the lithium salt is less than 0.2 M, the conductivity of the electrolyte may be lowered and thus the performance of the battery may be deteriorated. When the concentration of the lithium salt is more than 2 M, the viscosity of the electrolyte may increase and thus the mobility of the lithium ion may be reduced.

As the organic solvent contained in the non-aqueous electrolyte solution, those conventionally used in an electrolyte solution for a lithium secondary battery may be used without limitation, and for example, ether, ester, amide, linear carbonate, cyclic carbonate, etc. may be used alone or in combination of two or more. Among them, representatively, ether-based compounds may be comprised.

The ether-based compound may comprise acyclic ethers and cyclic ethers.

For example, the acyclic ether may be, but is not limited to, at least one selected from the group consisting of dimethyl ether, diethyl ether, dipropyl ether, methylethyl ether, methylpropyl ether, ethylpropyl ether, dimethoxyethane, diethoxyethane, methoxyethoxyethane, diethylene glycol dimethyl ether, diethylene glycol diethyl ether, diethylene glycol methylethyl ether, triethylene glycol dimethyl ether, triethylene glycol diethyl ether, triethylene glycol methylethyl ether, tetraethylene glycol dimethyl ether, tetraethylene glycol diethyl ether, tetraethylene glycol methylethyl ether, polyethylene glycol dimethyl ether, polyethylene glycol diethyl ether and polyethylene glycol methylethyl ether.

For example, the cyclic ether may be, but is not limited to, at least one selected from the group consisting of 1,3-dioxolane, 4,5-dimethyl-dioxolane, 4,5-diethyl-dioxolane, 4-methyl-1,3-dioxolane, 4-ethyl-1,3-dioxolane, tetrahydrofuran, 2-methyltetrahydrofuran, 2,5-dimethyltetrahydrofuran, 2,5-dimethoxytetrahydrofuran, 2-ethoxytetrahydrofuran, 2-methyl-1,3-dioxolane, 2-vinyl-1,3-dioxolane, 2,2-dimethyl-1,3-dioxolane, 2-methoxy-1,3-dioxolane, 2-ethyl-2-methyl-1,3-dioxolane, tetrahydropyran, 1,4-dioxane, 1,2-dimethoxy benzene, 1,3-dimethoxy benzene, 1,4-dimethoxy benzene and isosorbide dimethyl ether.

Examples of the ester of the organic solvent may include, but is not limited to, at least one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, and a mixture of two or more thereof.

Specific examples of the linear carbonate compound may representatively comprise, but is not limited to, at least one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more thereof.

In addition, specific examples of the cyclic carbonate compound may comprise at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate and halides thereof, or a mixture of two or more thereof. Examples of such halides include, but are not limited to, fluoroethylene carbonate (FEC) and the like.

The injection of the nonaqueous electrolyte solution may be performed at an appropriate stage of the manufacturing processes of the electrochemical device, depending on the manufacturing process and required properties of the final product. That is, the injection may be performed before assembling the electrochemical device or at the final stage of assembling the electrochemical device.

The lithium secondary battery according to the present invention may be manufactured by lamination, stacking, and folding processes of the separator and the electrodes, in addition to the usual winding process.

The shape of the lithium secondary battery is not particularly limited, and may be various shapes such as a cylindrical shape, a laminate shape and a coin shape.

Also, the present invention provides a battery module including the lithium secondary battery described above as a unit battery.

The battery module may be used as a power source for medium to large-sized devices requiring high temperature stability, long cycle characteristics, high capacity characteristics, and the like.

Examples of such medium to large-sized devices may comprise, but is not limited to, a power tool powered and moved by an electric motor; an electric car including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; a power storage system, etc.

MODE FOR INVENTION

Hereinafter, preferred examples of the present invention will be described in order to facilitate understanding of the present invention. It will be apparent to those skilled in the art, however, that the following examples are only illustrative of the present invention and various changes and modifications can be made within the scope and spirit of the present invention, and those such variations and modifications are within the scope of the appended claims.

Preparation Example: Preparation of Defect-Containing Molybdenum Disulfide

Preparation Example 1

0.82 g of ammonium heptamolybdate tetrahydrate (($NH_4$)$_6Mo_7O_{24} \cdot 4H_2O$), manufactured by Junsei Chemical) and 1.54 g of thiourea ($CH_4N_2S$, manufactured by Sigma Aldrich) were added to 20 ml of deionzied water and stirred vigorously for 30 minutes to prepare a uniform mixed solution (Mo:S=molar ratio of 1:4.3).

The mixed solution was placed in an autoclave made of Teflon surface-treated stainless steel and subjected to a hydrothermal synthesis reaction at 220° C. for 18 hours.

Thereafter, after slowly cooling to room temperature, the final product was washed several times with water and ethanol, and vacuum dried at 60° C. to prepare defect-containing molybdenum disulfide (defect-rich $MoS_2$) in the shape of nanosheet.

EXAMPLES AND COMPARATIVE EXAMPLES

Example 1

(1) Manufacture of Separator

As a porous substrate, 20 μm of polyethylene (porosity 68%) film was prepared.

A coating composition including 1% by weight of molybdenum disulfide containing defects obtained in Preparation Example 1 in ethanol was coated on the porous substrate to form a coating layer, and then dried at 60° C. for 12 hours to prepare a separator having a coating layer having a thickness of 1 μm.

(2) Manufacture of Lithium Secondary Battery 90 parts by weight of sulfur-carbon composite (S/C 7:3 parts by weight) as positive electrode active material, 5 parts by weight of Denka black as a conductive material and 5 parts by weight of styrene butadiene rubber/carboxymethyl cellulose as a binder (SBR/CMC 7:3) were added and mixed to prepare a slurry composition for a positive electrode.

Subsequently, the prepared slurry composition for a positive electrode was coated on an aluminum current collector, dried at 50° C. for 12 hours, and pressed with a roll press machine to prepare a positive electrode. The loading amount of the obtained positive electrode was 5.9 mAh/cm², and the porosity of the positive electrode was 68%.

Along with the positive electrode, a thin film of lithium metal having a thickness of 35 μm was used as a negative electrode. As an electrolyte, a mixed solution prepared by dissolving 1M of lithium bis (trifluoromethanesulfonyl) imide (LiTFSI) and 1% by weight of lithium nitrate ($LiNO_3$) in an organic solvent composed of 1,3-dioxolane and dimethyl ether (DOL:DME=1:1 (volume ratio)) was used.

Specifically, the positive electrode and the negative electrode manufactured were placed to face each other and the separator was placed therebetween so that the coating layer of the separator faces the negative electrode, and then 0.1 ml of the prepared electrolyte was injected to prepare a lithium secondary battery.

Example 2

A lithium secondary battery was manufactured in the same manner as in Example 1 above, except that the coating layer of the separator was disposed to face the positive electrode during the manufacture of the battery.

Comparative Example 1

A lithium secondary battery was manufactured in the same manner as in Example 1 above, except that a coating layer was not formed on the separator and a porous substrate was used as it was.

Comparative Example 2

A lithium secondary battery was manufactured in the same manner as in Example 1 above, except that a coating layer is formed using a coating composition in which defect-free molybdenum disulfide (defect-free $MoS_2$, manufactured by Sigma Aldrich) instead of defect-containing molybdenum disulfide obtained in Preparation Example 1 is dissolved in the same amount.

Experimental Example 1. Analysis by Scanning Electron Microscope and High-Resolution Transmission Electron Microscope The defect-containing molybdenum disulfide prepared in Preparation Example 1 was observed with a scanning electron microscope (SEM) and a high-resolution transmission electron microscope (HR-TEM). S-4800 from Hitachi was used as a scanning electron microscope, and JEM-2100F from JEOL was used as a high-resolution transmission electron microscope. The results obtained at this time are shown in FIGS. 1 and 2.

Figure 1:
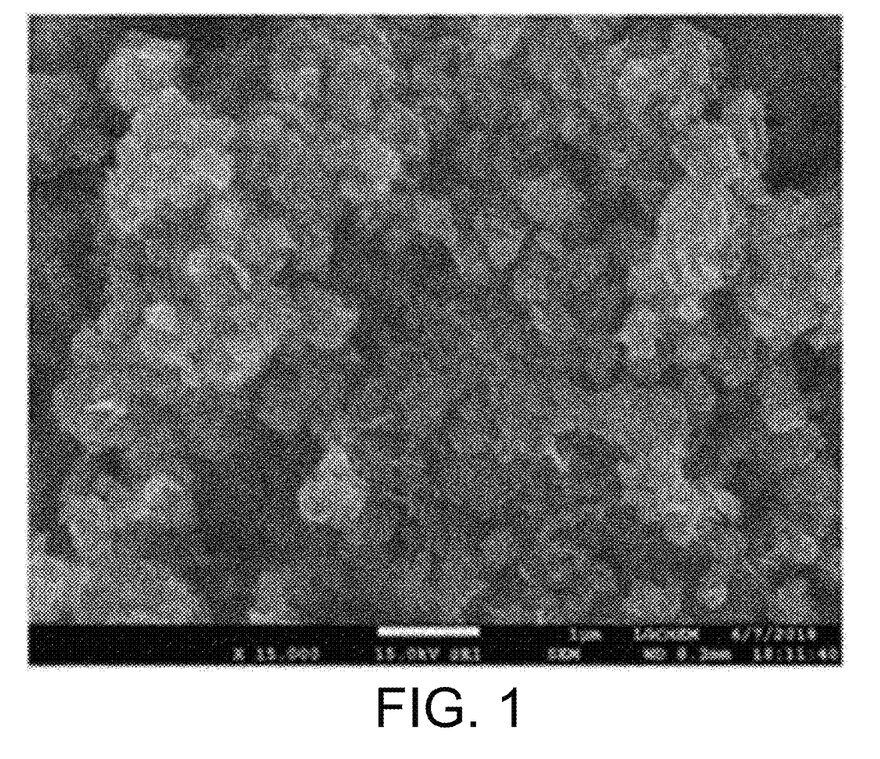
FIG. 1 is an image from a scanning electron microscope (SEM) for the defect-containing molybdenum disulfide according to Preparation Example 1 of the present invention.

Referring to FIG. 1, it can be confirmed that defect-containing molybdenum disulfide in the shape of a thin nanosheet was formed from Preparation Example 1.

Figure 2:
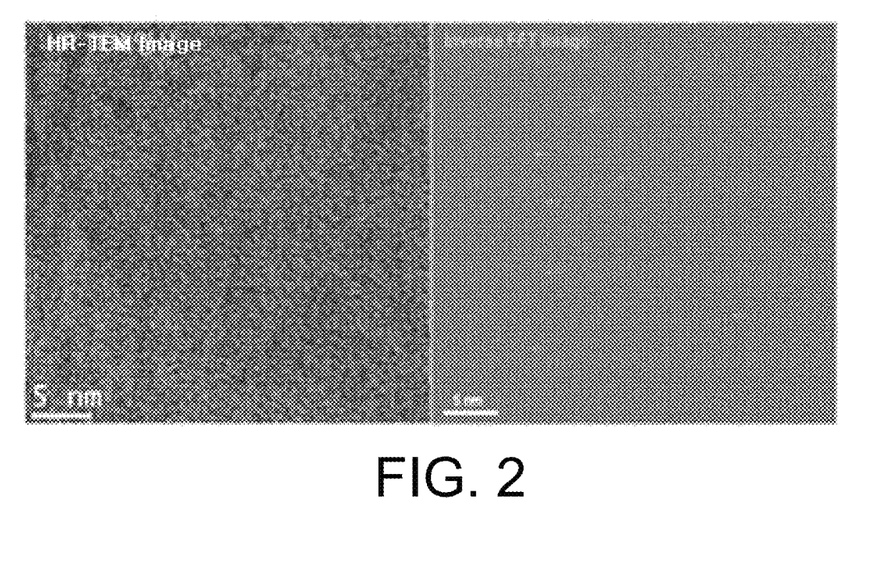
FIG. 2 is an image from a high-resolution transmission electron microscope (HR-TEM) for the defect-containing molybdenum disulfide according to Preparation Example 1 of the present invention.

Referring to FIG. 2, when considering that several disordered atomic arrangements are identified on the surface of defect-containing molybdenum disulfide in the shape of a nanosheet, it can be confirmed that there are a plurality of defects (arrows).

Experimental Example 2. Measurement of X-Ray Diffraction

The defect-containing molybdenum disulfide according to Preparation Example 1 was subjected to the measurement of X-ray diffraction (XRD) pattern. The XRD device used in this experiment was a device for Rigaku MiniFlex 600 X-ray diffraction analysis, which is a solid phase detector, using Cu-Kα X-ray with a wavelength of 1.5418 Å. The results obtained at this time are shown in FIG. 3.

Figure 3:
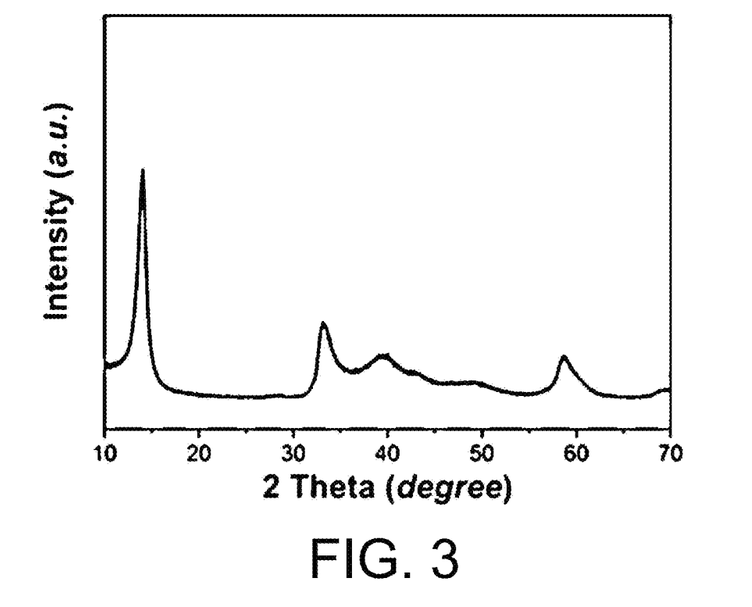
FIG. 3 is a graph showing the results of X-ray diffraction measurement for the defect-containing molybdenum disulfide according to Preparation Example 1 of the present invention.

Referring to FIG. 3, in the case of defect-containing molybdenum disulfide prepared according to Preparation Example 1, effective diffraction peaks were observed at diffraction angles (2θ) of 14.0±0.2°, 33.1±0.2°, 39.4±0.2° and 58.7±0.2°. Since these peaks are effective peaks corresponding to the crystal planes of (002), (100, 101), (103) and (110), respectively, it can be confirmed that defect-containing molybdenum disulfide of Preparation Example 1 is crystalline.

Experimental Example 3. Analysis by Energy Dispersive X-Ray Spectrometer

The defect-containing molybdenum disulfide according to Preparation Example 1 and the defect-free molybdenum disulfide used in Comparative Example 2 were subjected to the analysis by an energy dispersive X-ray spectrometer (EDS). The EDS device used in the above experiment was JSM-7610F manufactured by JEOL. The results obtained at this time are shown in Table 1 and FIGS. 4 and 5.

TABLE 1

| Spectrum | Defect-containing molybdenum disulfide | | | | Defect-free Molybdenum disulfide | | |
|---|---|---|---|---|---|---|---|
| | 1 | 2 | 3 | 4 | 6 | 7 | 8 |
| S (atom %) | 64.64 | 62.97 | 64.20 | 64.02 | 66.47 | 66.45 | 67.76 |
| Mo (atom %) | 35.36 | 37.03 | 35.80 | 35.98 | 33.53 | 33.55 | 32.24 |
| S/Mo | 1.82 | 1.70 | 1.79 | 1.77 | 1.98 | 1.98 | 2.10 |

Figure 4:
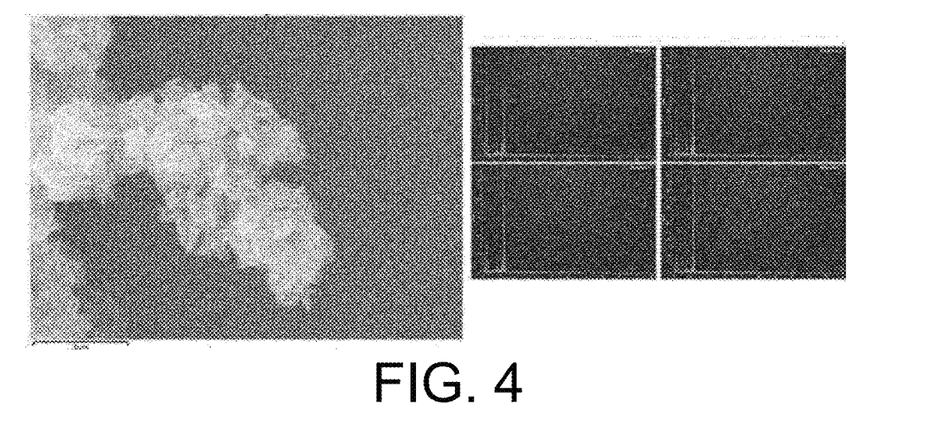
FIG. 4 is an image showing the results of EDS analysis for the defect-containing molybdenum disulfide according to Preparation Example 1 of the present invention.
Figure 5:
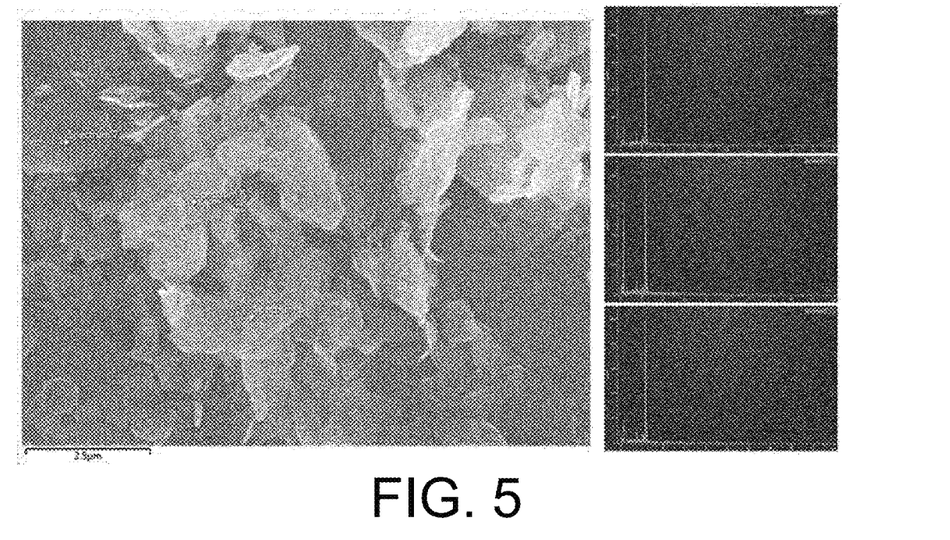
FIG. 5 is an image showing the results of EDS analysis for the defect-free molybdenum disulfide.

Referring to FIGS. 4 and 5 and Table 1 above, it can be confirmed that in the case of defect-free molybdenum disulfide (spectrums 6 to 8), the ratio of S/Mo is 2.0, so it is represented by the formula of $MoS_2$, but if elemental analysis is performed through EDS for defect-containing molybdenum disulfide (spectrums 1 to 4), the ratio of S/Mo is 1.77 on average.

Experimental Example 4: Evaluation of Adsorption Effect on Lithium Polysulfide

The absorbance of a solution of lithium polysulfide ($Li_2S_6$) for the defect-containing molybdenum disulfide according to Preparation Example 1 and the carbon nanotube used as a conventional adsorption material for lithium-polysulfide was measured. When measuring the absorbance, the UV-Vis spectrophotometer was Agilent 8453 from Agilent. The lower the measured absorbance, the better the adsorption effect for lithium polysulfide. The results obtained at this time are shown in FIG. 6.

Figure 6:
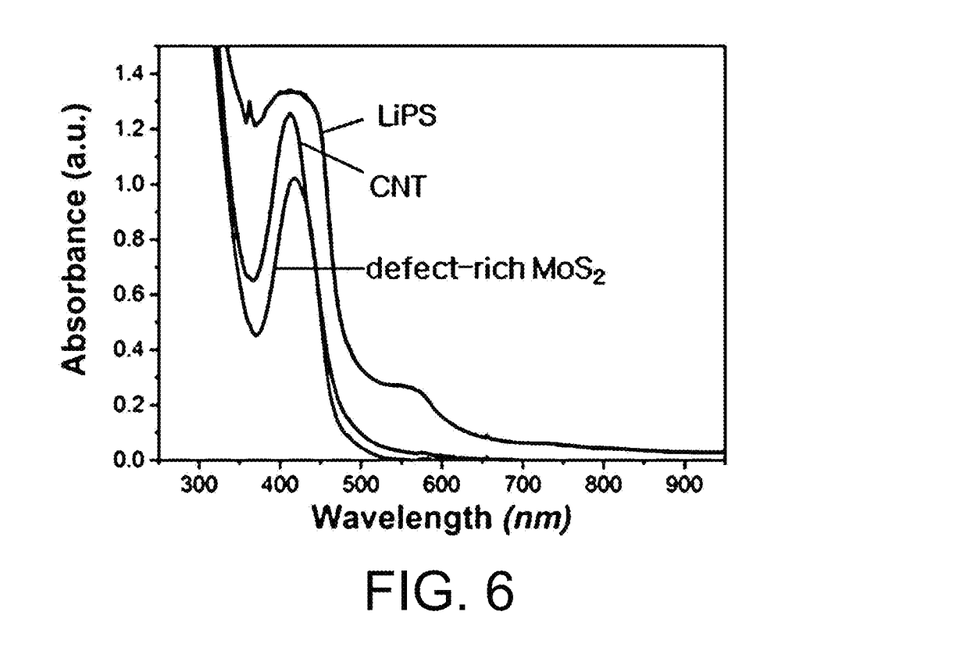
FIG. 6 is a graph showing the evaluation results of the adsorption effect of lithium polysulfide by the defect-containing molybdenum disulfide according to Preparation Example 1 of the present invention.

As shown in FIG. 6, as a result of adsorbing lithium polysulfide using each of defect-containing molybdenum disulfide of Preparation Example 1 and carbon nanotube, the absorbance was decreased. Through this, it can be confirmed that both materials show an adsorption effect for lithium polysulfide. Particularly, in FIG. 6, since the reduction width of the absorbance of the defect-containing molybdenum disulfide of Preparation Example 1 is greater than that of the carbon nanotube, it can be seen that the defect-containing molybdenum disulfide of the present invention has more excellent adsorption capacity for lithium polysulfide.

Experimental Example 5: Analysis by Scanning Electron Microscope

The separator prepared in Example 1 was observed with a scanning electron microscope (SEM). S-4800 from Hitachi was used as a scanning electron microscope. The results obtained at this time are shown in FIG. 7.

Figure 7:
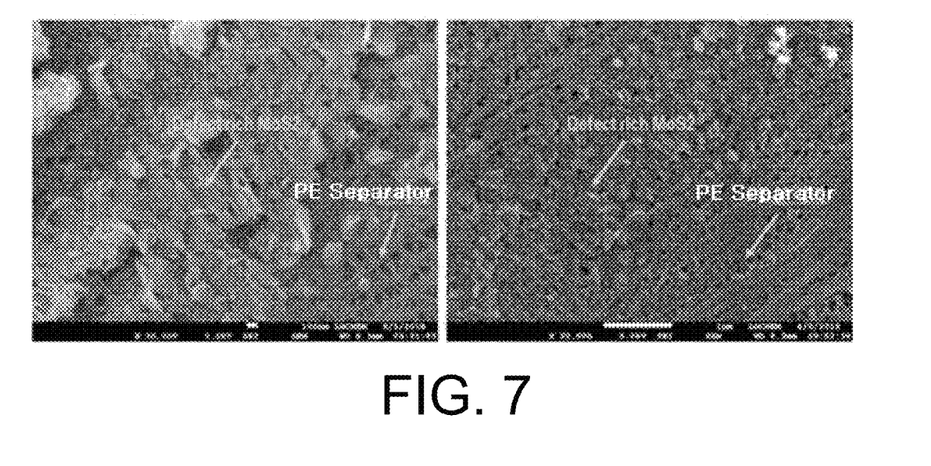
FIG. 7 is an image from a scanning electron microscope (SEM) for the separator according to Example 1 of the present invention.

Through FIG. 7, it can be confirmed that in the case of the separator of Example 1, a coating layer containing defect-containing molybdenum disulfide is uniformly formed on the substrate.

Experimental Example 6: Evaluation of Lifetime Characteristics of Battery

The batteries prepared in the examples and comparative examples were repeatedly discharged and charged three times with a current density of 0.1 C, and then discharged and charged three times with a current density of 0.2 C, and thereafter discharging capacity and Coulomb efficiency were measured, while discharging at 0.5 C and charging at 0.3 C, to evaluate the lifetime characteristics of the batteries. The results obtained at this time are shown in FIG. 8.

Figure 8:
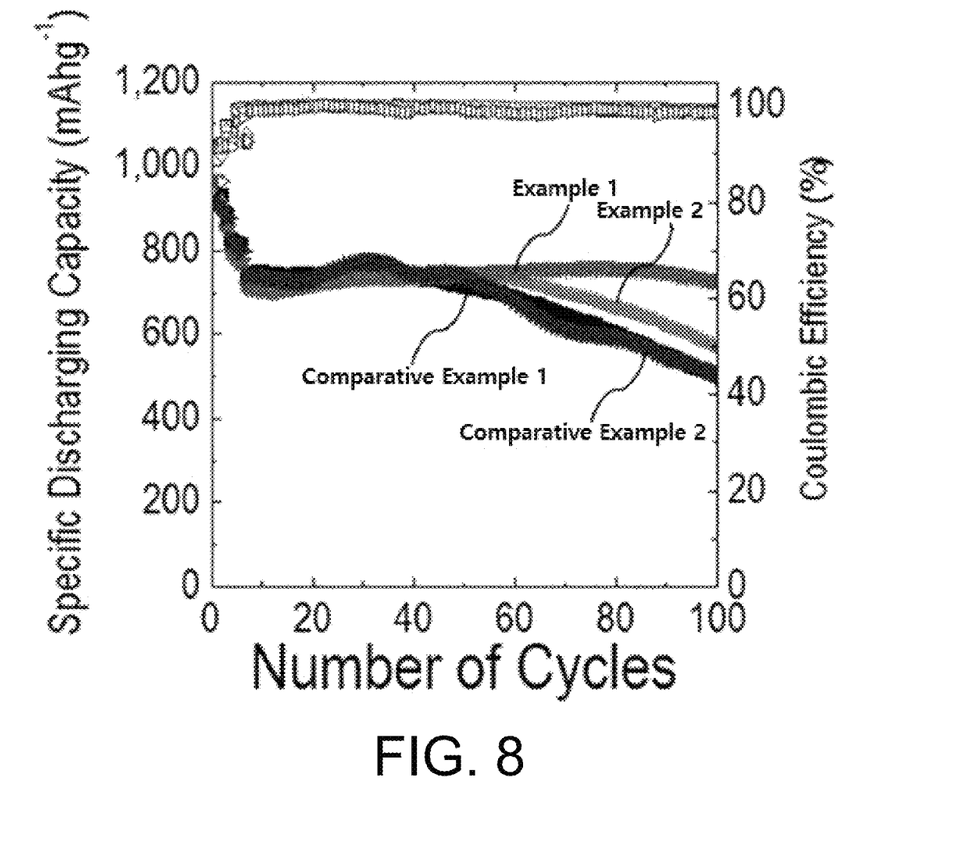
FIG. 8 is a graph showing evaluation results of lifetime characteristics of the batteries of the examples and comparative examples according to Experimental Example 6 of the present invention.

As shown in FIG. 8, it can be seen that in the case of the battery according to the examples, the numbers of discharging capacity are higher than those of the comparative examples, and the Coulomb efficiencies are also excellent, thereby improving lifetime characteristics.

In addition, when comparing the results of Examples 1 and 2 with different positions of the coating layers, it can be seen that the lifetime characteristics of Example 1, in which the coating layer is placed to face the negative electrode, is superior to the example in which the coating layer is placed to face the positive electrode.

From these results, it can be seen that when the separator comprising the coating layer according to the present invention is used, since the defect-containing molybdenum disulfide included in the coating layer is allowed to adsorb lithium polysulfide leached from the positive electrode to the coating layer and thus to inhibit the growth of the lithium dendrite, the lithium secondary battery has excellent capacity characteristics while having improved lifetime characteristics.

The invention claimed is:

1. A separator for a lithium secondary battery comprising:
   a porous substrate; and
   a coating layer on at least one surface of the porous substrate,
   wherein the coating layer comprises defect-containing molybdenum disulfide;
   wherein the defect-containing molybdenum disulfide has diffraction peaks that appear in a range of diffraction angles (2θ) of 14.0±0.2°, 33.1±0.2°, 39.4±0.2° and 58.7±0.2°, respectively, as measured by X-ray diffraction (XRD); and
   wherein the defect-containing molybdenum disulfide is a compound represented by $MoS_{2-x}$, and wherein 0<x<0.5.

2. The separator for the lithium secondary battery according to claim 1, wherein the defect-containing molybdenum disulfide is in a shape of a nanosheet.

3. The separator for the lithium secondary battery according to claim 2, wherein the nanosheet has a thickness of from 1 nm to 20 nm.

4. The separator for the lithium secondary battery according to claim 1, wherein the defect-containing molybdenum disulfide is crystalline.

5. The separator for the lithium secondary battery according to claim 1, wherein the defect of the defect-containing molybdenum disulfide is at least one selected from the group consisting of a point defect, a line defect and a plane defect.

6. The separator for the lithium secondary battery according to claim 1, wherein the coating layer has a thickness of from 0.1 μm to 10 μm.

7. The separator for the lithium secondary battery according to claim 1, wherein the coating layer is disposed to face a negative electrode of the lithium secondary battery.

8. A lithium secondary battery comprising: a positive electrode; a negative electrode; a separator interposed therebetween and an electrolyte,
   wherein the separator comprises the separator according to claim 1.

9. The lithium secondary battery according to claim 8, wherein the positive electrode comprises at least one selected from the group consisting of a sulfur element and a sulfur-based compound as a positive electrode active material.

10. The lithium secondary battery according to claim 8, wherein the coating layer is disposed to face the negative electrode of the lithium secondary battery.

* * * * *